United States Patent

Bercheny et al.

[11] Patent Number: 6,092,607
[45] Date of Patent: Jul. 25, 2000

[54] HYDRAULIC GROUND-CLEANING APPARATUS

[76] Inventors: Anthony R. Bercheny, 13644 Buno Rd., Milford, Mich. 48380; Michael J. Thompson, 1655 Bogie Lake Rd., White Lake, Mich. 48383

[21] Appl. No.: 09/417,969

[22] Filed: Oct. 13, 1999

[51] Int. Cl.[7] .................................................. A01D 17/08
[52] U.S. Cl. ............................................ 171/63; 171/132
[58] Field of Search ............................. 171/63, 116, 132, 171/4, 14, 15, 18, 67, 111, 124

[56] References Cited

U.S. PATENT DOCUMENTS

| | | | |
|---|---|---|---|
| 3,637,024 | 1/1972 | Baskett | 171/63 |
| 4,113,023 | 9/1978 | Baskett | 171/63 |
| 4,241,792 | 12/1980 | Kratzer | 171/63 |
| 4,364,434 | 12/1982 | Erholm | 171/63 |
| 5,060,732 | 10/1991 | Baskett | 171/63 |
| 5,437,333 | 8/1995 | McPherson et al. | 171/63 X |
| 5,564,506 | 10/1996 | Foster et al. | 171/63 |
| 5,630,476 | 5/1997 | Foster et al. | 171/63 |
| 5,682,953 | 11/1997 | Buysse | 171/63 |
| 5,816,334 | 10/1998 | Haggerty | 171/63 |

Primary Examiner—Christopher J. Novosad
Attorney, Agent, or Firm—Harness, Dickey & Pierce, P.L.C.

[57] ABSTRACT

A ground-cleaning apparatus for separating debris from soil according to the invention includes a paddle assembly, a separation bin, and a hydraulic assembly, each mounted on a chassis having a front frame and a rear frame. The paddle assembly is rotatably supported on the front frame and includes paddles for agitating the ground surface and carrying soil and debris to the separation bin. The separation bin is supported on the rear frame and includes a sifting screen partially surrounded by sidewalls and a rear wall. The hydraulic assembly includes a selectively actuated piston and cylinder assembly for reciprocating the separation bin. Paddles agitate the ground surface and deposits the soil and debris on the separation bin, where the debris is trapped by the sifting screen and the soil passes through the sifting screen as the separation bin is reciprocated by the piston and cylinder assembly.

22 Claims, 4 Drawing Sheets

HYDRAULIC GROUND-CLEANING APPARATUS

BACKGROUND OF THE INVENTION

The present invention relates to an apparatus for separating rocks and other debris from top soil, and more particularly to a ground-cleaning apparatus for sweeping soil and debris, separating out the debris, and collecting the debris for disposal.

Separating debris from top soil is a basic initial task for construction and landscape jobs. In most construction jobs, the contractor preferably excavates and grades the supporting ground before construction begins. In landscaping, the landscaper preferably cleans and grades the top soil prior to planting grass or laying sod, for example. In each case, it is necessary to separate rocks, sticks, litter, and other debris from the soil. Such a process is conventionally time and labor intensive, and thus very costly.

Conventionally debris has been separated from soil by using a dozer or the like to stockpile soil near a powered shaker screen for separating debris from the soil. For smaller jobs, particularly landscaping, laborers with rakes often separate debris from the soil. Through the use of a payloader, or perhaps laborers with shovels, the stockpiled soil and debris is loaded onto the shaker's vibrating screen until the debris is separated from the soil. This soil cleaned of debris is then re-stockpiled, while the rocks and other debris are placed in a waste collection area for removal from the site. The stockpiled clean soil is then spread over the ground by a dozer or the like, typically followed by a tractor or other machine for grading the top soil.

There have been a few attempts to improve this process, such as U.S. Pat. No. 5,816,334, which describes a commercial excavating apparatus having a large tractor linked to a chassis supporting a paddle assembly for lifting dirt and debris onto a vibrating separation screen through which soil falls and dirt and debris is moved to a conveyor assembly, which carries the debris to a collection bin. This large, complex assembly does not provide flexibility or maneuverability, which are especially necessary for smaller applications such as landscaping. Further, the complexity of the system increases the cost of manufacture and use, as well as the risk of malfunction. Accordingly, such a system designed for large, commercial excavation projects is not simply maneuverable, not easily adapted for use in smaller projects, nor affordable by smaller operators. Thus, an improved ground-cleaning apparatus which provides flexibility, maneuverability, and affordability is desirable.

SUMMARY OF THE INVENTION

According to the invention, a ground-cleaning apparatus includes a frame rotatably supporting a paddle assembly having a plurality of elongated paddles, a separation bin pivotally connected to the frame and supported rearwardly by a roller, and a hydraulic assembly including a hydraulic motor for reciprocating, i.e., agitating, the separation bin. The ground-cleaning apparatus is pulled by a conventional vehicle such as a tractor or Bobcat® along the ground surface to be cleaned. As the towing vehicle is advanced, elongated paddles strike the ground to agitate and carry dirt and debris from the ground to the separation bin. The separation bin is simultaneously reciprocated by the hydraulic assembly such that soil passes through a sifting screen and is redeposited on the ground while rock and debris are collected. Once the ground surface has been cleared, or upon filling the separation bin, the tractor carries the apparatus to a dump site, whereupon the tractor tilts hydraulic arms to empty the contents of the separation bin.

For a more complete understanding of the invention, its objects and advantages, reference may be had to the following specification and to the accompanying drawings.

BRIEF DESCRIPTION OF THE DRAWINGS

Further objects, features and advantages of the present invention will become readily apparent from the following detailed specification and the appended claims which, in conjunction with drawings, set forth the best mode now contemplated for carrying out the invention. Referring to the drawings:

DETAILED DESCRIPTION OF THE PREFERRED EMBODIMENTS

Figure 1:
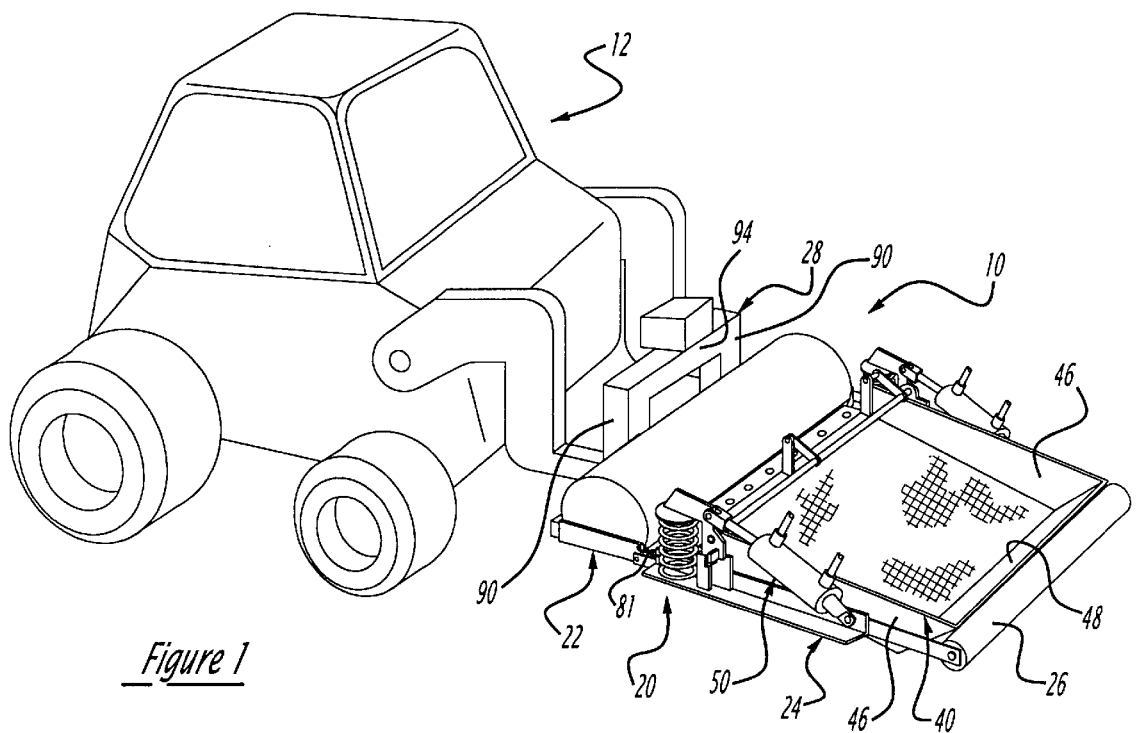
FIG. 1 is a perspective view of a ground-cleaning apparatus according to the invention connected to a conventional tractor.
Figure 2:
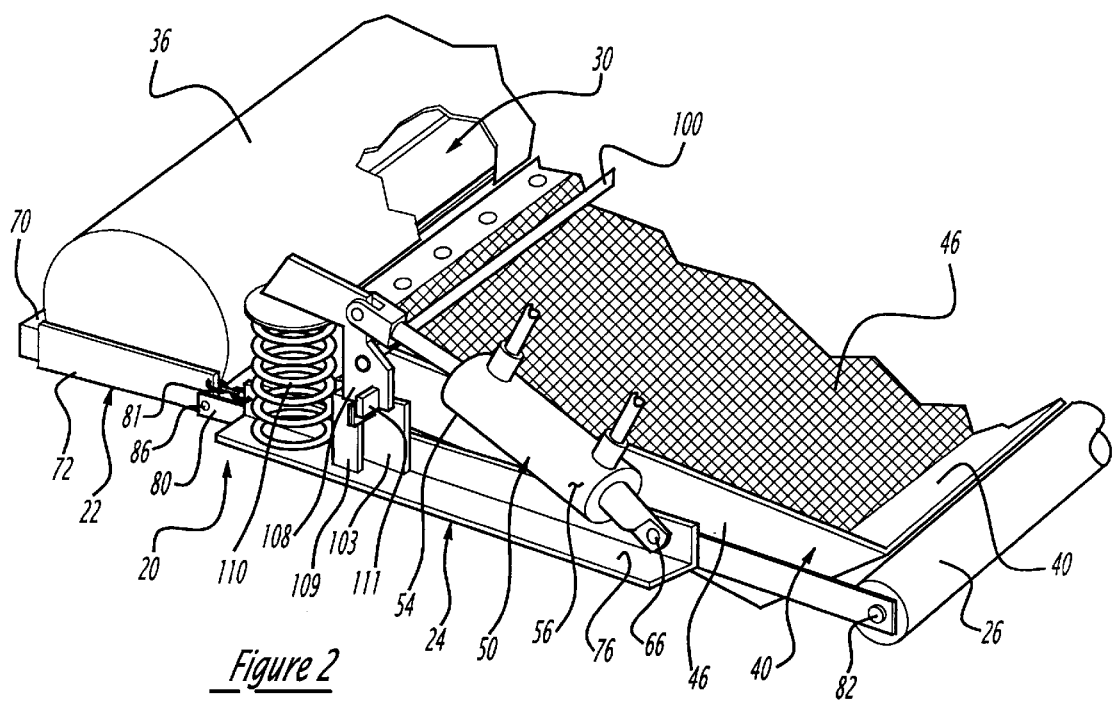
FIG. 2 is a partial perspective view of the ground-cleaning apparatus of FIG. 1.

With reference to FIGS. 1 and 2, a ground-cleaning apparatus 10 according to the invention is shown operationally connected to a conventional vehicle 12 such as a tractor or the like. The ground-cleaning apparatus 10 generally includes a chassis 20 supporting a paddle assembly 30, a separation bin 40, and a hydraulic assembly 50.

Chassis 20 includes a front frame 22 rigidly connected to tractor 12 and a rear frame 24 pivotally connected to the front frame. Disposed along the distal end of rear frame 24 is a rotatably mounted roller 26. Paddle assembly 30 is mounted to front frame 22 of the chassis 20, while separation bin 40 is supported by rear frame 24 of chassis 20. Hydraulic assembly 50 is powered by a hydraulic power supply of vehicle 12 and includes a hydraulic switching valve 116 preferably mounted to front frame 22 of chassis 20, and piston and cylinder assemblies 54 mounted between rear frame 24 and separation bin 40.

Figure 5:
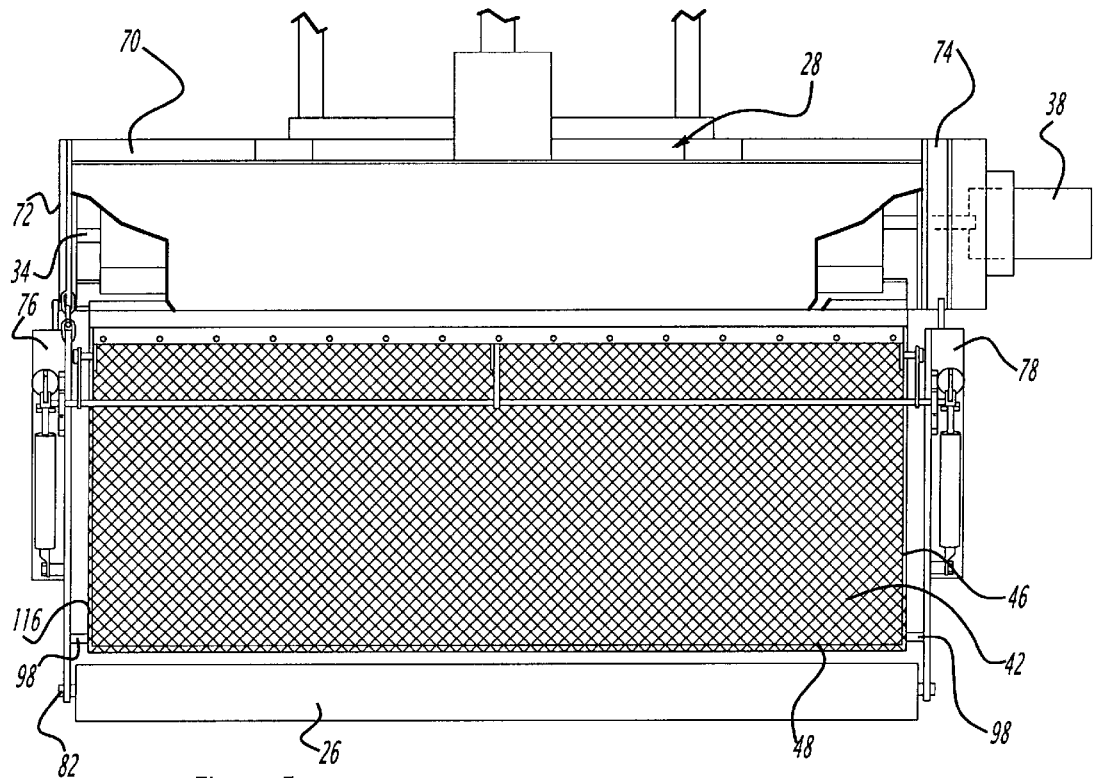
FIG. 5 is a partially sectioned top view of the ground-cleaning apparatus of FIG. 1.
Figure 7:
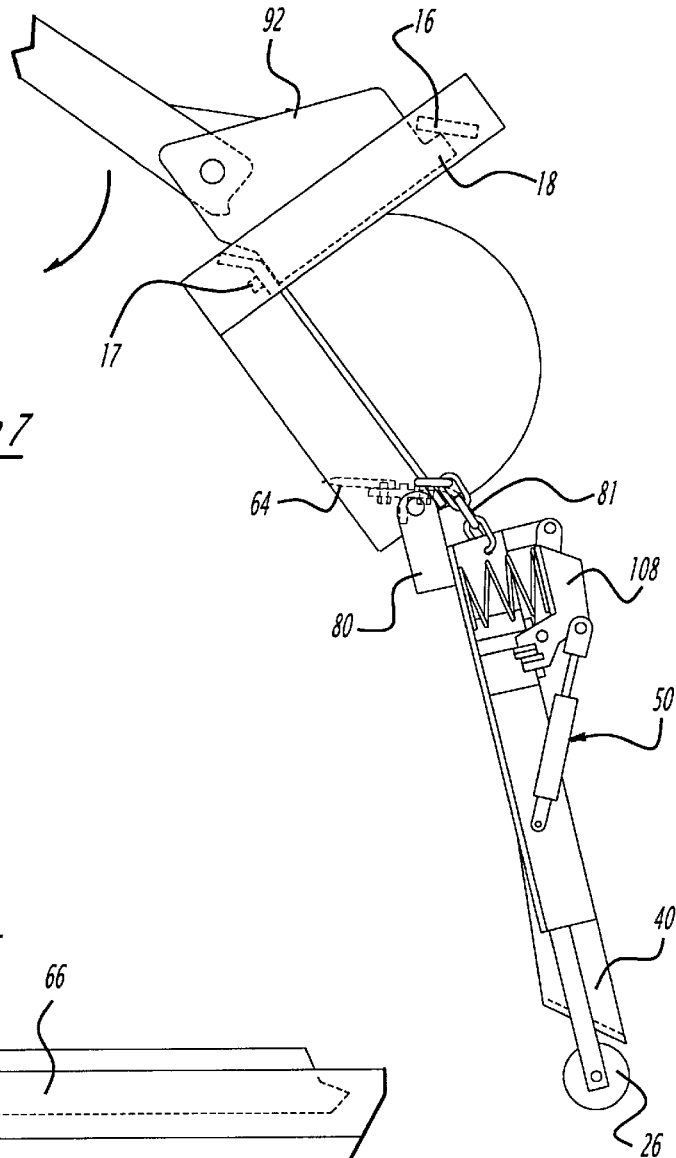
FIG. 7 is a partial side view of the ground-cleaning apparatus of FIG. 1 in a position for emptying the separation bin.
Figure 8:
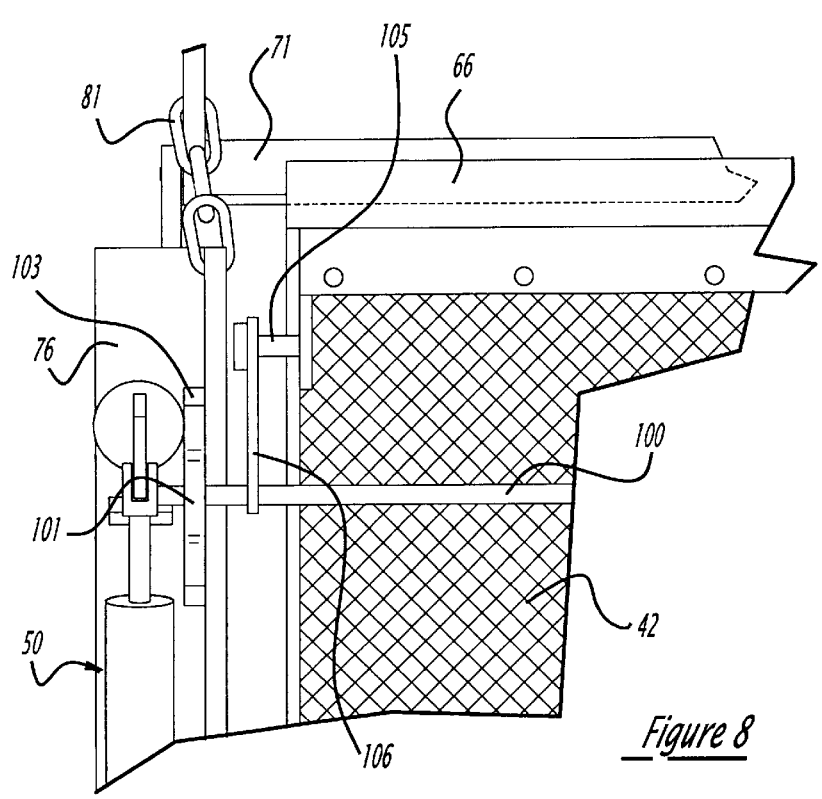
FIG. 8 is a partial top view of the pivotal and hydraulic connections between the frame and separation bin of the ground-cleaning apparatus of FIG. 1.

More specifically, front frame 22 includes a longitudinal front rail 70 having transversely extending and parallel short rails 72, 74 at each end, as shown further in FIG. 5, connecting front rail 70 to a longitudinal rear rail 71, as shown in FIG. 7. The rear frame 24 is pivotally connected at the distal end of each rail 72, 74, and includes roller 26 connecting transversely extending and parallel rails 76, 78. At the end proximate roller 26, rails 76, 78 include apertures for journaling axle 82 of roller 26. At the end proximate front frame 22, each rail 76, 78 includes a bracket 80 for receiving a pin 86 at the end of each rail 72, 74 of front frame 22 for pivotally connecting rear frame 24 to front frame 22. Rotation of rear frame 24 relative front frame 22 is limited by a stop chain 81.

Longitudinal rail 70 of front frame 22 includes an upstanding mounting bracket 28 for rigidly connecting chassis 20 to tractor 12. Mounting bracket 28 is preferably a U-shaped structure disposed intermediately on and extending upwardly from longitudinal rail 70. The mounting bracket 28 comprises spaced apart and parallel upstanding supports 90 joined at their uppermost ends by top rail 94, which is disposed parallel to longitudinal rail 70 and separated therefrom by upstanding supports 90. With reference to FIG. 7, mounting bracket 28 preferably includes a hook 16 shaped for reception of a tab 18 on lift assembly 92 of tractor 12. A pin 17 of lift assembly 92 locks lift assembly 92 to mounting bracket 28. Actuating the hydraulic cylinder 93 of lift assembly 92 tips chassis 20 for dumping the contents of separation bin 40.

Figure 3:
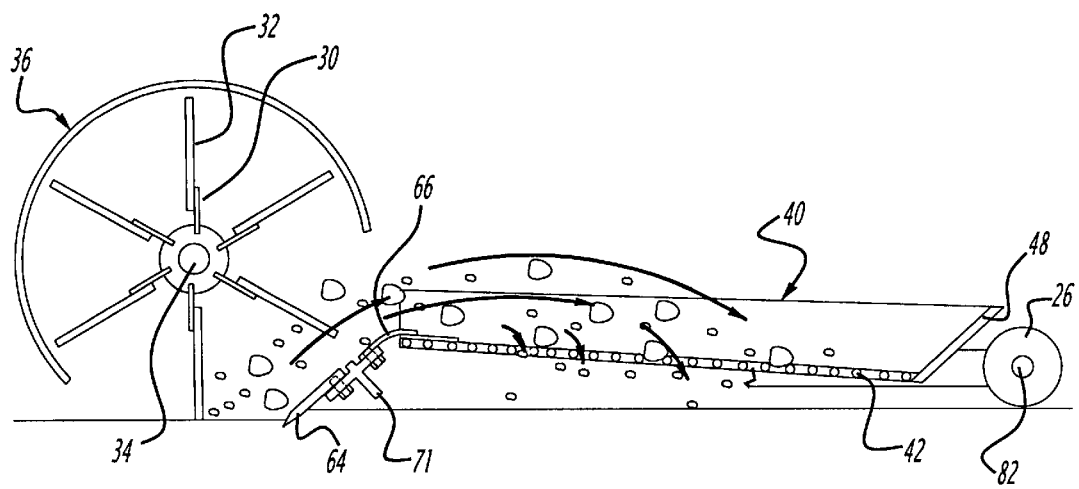
FIG. 3 is a side sectional view of the ground-cleaning apparatus of FIG. 1.
Figure 4:
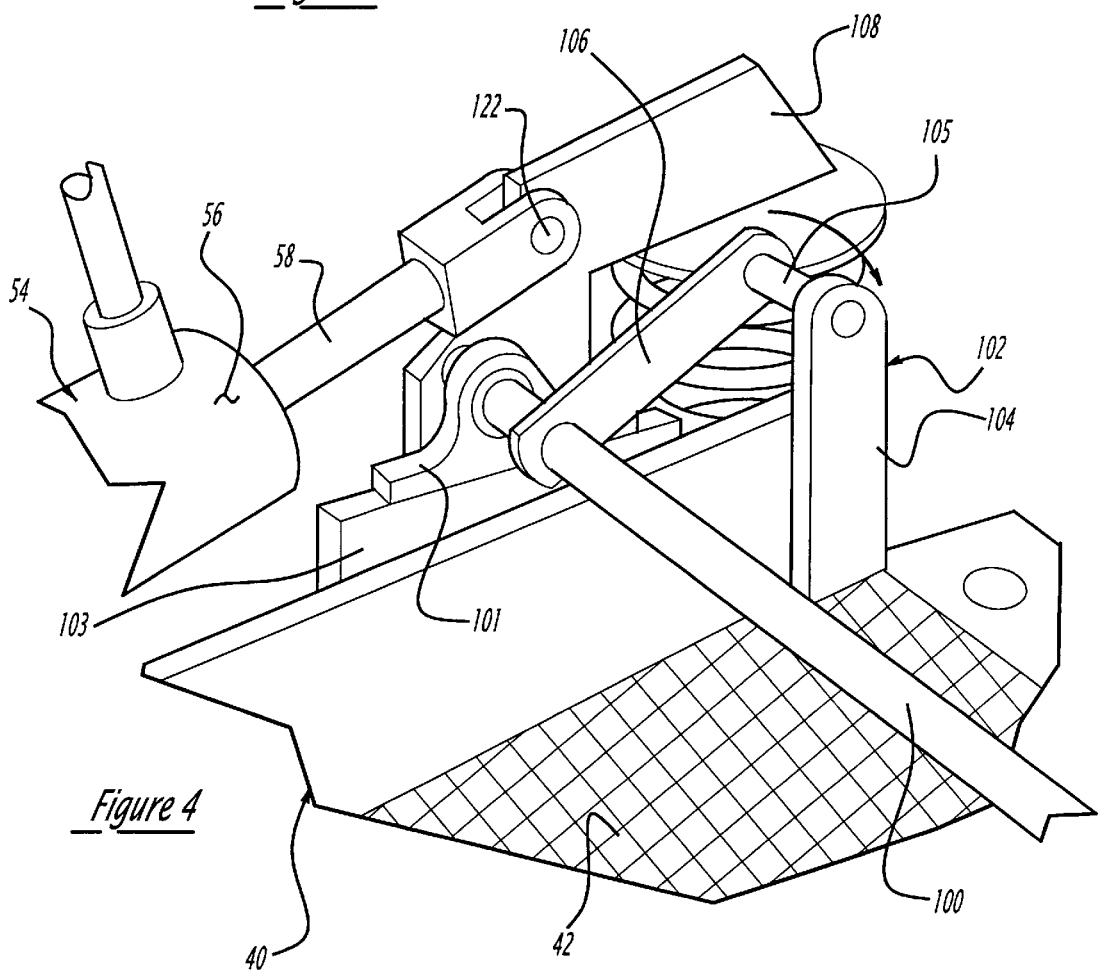
FIG. 4 is a partial perspective view of the pivotal and hydraulic connections between a frame and separation bin of the ground-cleaning apparatus of FIG. 1.

As shown best on FIGS. 2 and 3, paddle assembly 30 preferably includes multiple paddles 32 equidistantly spaced apart and mounted to an axle 34, which is longitudinally disposed and journaled for rotation relative front frame 22 of chassis 20. Further, paddles 32 and axle 34 are enclosed by a generally semi-cylindrical housing 36 that is mounted to front frame 22 of chassis 20 and arcuately extends from the foremost portion of front frame 22 to a rearmost portion of front frame 22. With reference to FIG. 5, the longitudinally extending axle 34 is supported at each end by a bearing (not shown) mounted to rails 72, 74. In the preferred embodiment, the axle 34 is powered by a hydraulic motor 38, which imparts rotation to the axle 34 and thus paddles 32. While motor 38 for powering axle 34 is shown, the paddle assembly 30 can alternatively be powered by a power take-off of tractor 12 or by an internal combustion engine, by way of non-limiting example. Motor 38 powers a proximate end of axle 34, while a distal end of axle 34 rotates in the bearing supported by rail 72. Motor 38 is preferably supported by rail 74, as shown. In a preferred embodiment, the speed of axle 34 can be selected by an operator by adjusting a throttle (not shown) on motor 38. Alternatively, the motor 38 may operate at a single speed. In a power take-off system, speed selection by the operator can be accomplished by selective clutch engagement such as through a clutch pack, as is well-known in the art.

As shown in FIGS. 2–5, separation bin 40 is supported in the opening formed by rear frame 24 of chassis 20 by side rails 76, 78. Separation bin 40 includes a sifting screen 42 forming a bottom wall, which is partially surrounded by opposed side walls 46 and a rear wall 48. Front portion 44 of shifting screen 42 is open to receive dirt and debris from paddle assembly 30. The walls 46, 48 and sifting screen 42 form a collection chamber for rock and debris separated from soil. Further, rear wall 48 is preferably angled rearwardly from sifting screen 42 to accommodate dumping of collected rock and debris. Sifting screen 42 may be sized for a particular use but generally includes apertures sized to allow soil to pass therethrough while retaining rocks and other debris.

To facilitate separation, separation bin 40 is connected to side rails 76, 78 by pivot axles 98 (shown in FIG. 5), which are journaled in side walls 46 adjacent to rear wall 48, and by piston and cylinder assemblies 54, which impart motion to separation bin 40. Motion produced by piston cylinder assemblies 54 cause debris to separate from soil, which passes through openings in sifting screen 42. Axles 98 permit translation of bin 40. Preferably, sifting screen 42 is sloped slightly rearwardly to cause accumulation of debris in a rearmost portion of separation bin 40, which includes taller side rear walls 46, 48 to accommodate the accumulation. Of course, the height of walls 46, 48 can be varied to accommodate the desired capacity of separation bin 40.

As illustrated best in FIG. 3, separation bin 40 includes an angled deflector 64 at front portion 44 of sifting screen 42 for defining a ramp toward sifting screen 42 from the ground surface being cleaned. Thus, when paddles 32 agitate the ground surface and propel dirt and debris toward separation bin 40, deflector 64 directs the dirt and debris into separation bin 40 and prevents agitated dirt and debris from passing beneath separation bin 40. Thus, in a preferred embodiment, deflector 64 extends proximate to the ground surface being cleaned so that agitated dirt and debris can not escape separation bin 40. As shown, deflector 64 is supported by rear rail 71, which is connected to a front portion of separation bin 40 by a flexible portion 66. Flexible portion 66 accommodates movement of separation bin 40 relative front frame 22 during use.

Separation bin 40 is mounted to rear portion 24 of chassis 20 through pivot axle 98 on each side of bin 40 near roller 26. An axle 100 extending longitudinally across separation bin 40 supports a foremost portion of separation bin 40 through actuating members 106 and support arms 102, as shown best in FIGS. 2, 4 and 5. Support arms 102 include an upstanding member 104 secured at their lower ends to bin 40 and pivotally connected through fingers 105 at their uppermost end to actuating members 106, which at its distal end mounts longitudinally extending axle 100. Axle 100 is connected at each end to a rocker arm 108, which is disposed adjacent side rails 76, 78 and connected to a piston arm 58 of piston and cylinder assembly 54. Further, axle 100 is supported for rotation via bearings 101, which are mounted on supports 103 extending upwardly from rails 76, 78.

Piston and cylinder assembly 54 is supported at its lower end through pivotal connection 66 of cylinder 56 to rear portion 24 of chassis 20. Thus, separation bin 40 is essentially hung from axle 100 through actuating members 106, which are supported by chassis 20 through piston and cylinder assemblies 54, rocker arms 108, and axle 100. Further, rocker arms 108, and thus axle 100, are biased by springs 110 to support separation bin 40 generally parallel to a ground surface being cleaned. Hydraulic assembly 50 reciprocates separation bin 40 through rocker arms 108, which rotate axle 100 in bearing 101 through selective hydraulic operation of piston and cylinder assemblies 54. Rotation of rocker arms 108 away from spring 110 is limited by a stop 109. Rotation of axle 100 forces ends of arms 106 connected to support arms 102 through fingers 105 to swing generally upwardly and downwardly, thereby reciprocating separation bin 40.

Piston and cylinder assemblies 54 include hydraulic cylinder 56 receiving piston 58 therein. Piston cylinders 56 are pivotally connected to side rails 76, 78 via connections 66 disposed rearwardly on each rail 74, 76. Piston 58 is axially slidably received within cylinder housing 56 and connected at a distal end to rocker arm 108 via an axle 122. Hydraulic assembly 50 provides hydraulic fluid to provide power to piston and cylinder assemblies 54 to selectively move separation bin 40 upwardly and downwardly. More specifically, by selectively providing hydraulic fluid to each piston cylinder 56, pistons 58 reciprocate in cylinder 56, thereby causing rocker arms 108 to rotate axle 100.

Figure 6:
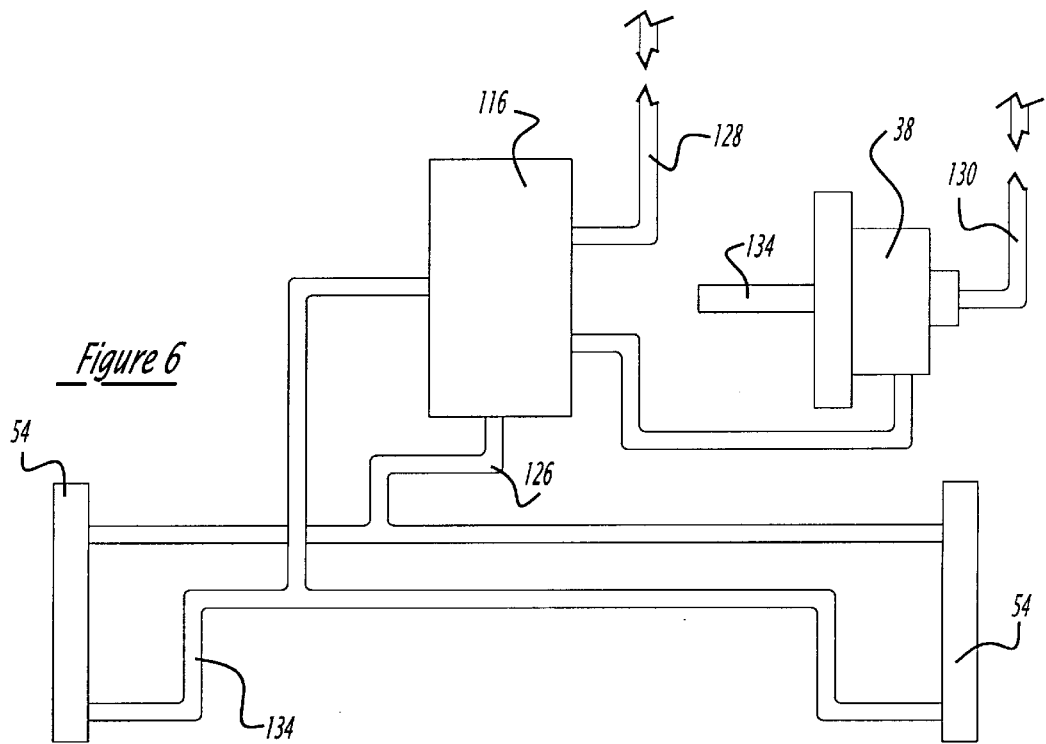
FIG. 6 is a diagram of the hydraulic system for the ground-cleaning apparatus of FIG. 1.

With reference to FIG. 6, piston and cylinder assemblies 54 are connected to a hydraulic power supply 52 by a first hydraulic supply line 130 connected to hydraulic motor 38 for driving paddle assembly 30, and then to hydraulic switching valve 116, which selectively supplies piston and cylinder assemblies 54 via supply line 126. Specifically, line 126 is connected to a first chamber in each cylinder 56. A return line 134 connected to a second chamber in each cylinder 56 returns fluid to hydraulic switching valve 116, and then to hydraulic power supply 52 via line 128. Movement of the piston 58 forces each rocker arm 108 to overcome the bias of spring 110 and rotate axle 100, which forces actuating members 106 to rotate with axle 100 and force support arms 102 upwardly or downwardly with each piston stroke. The hydraulic switching valve 116 is a timed valve mechanism for selective supply of hydraulic fluid to supply line 126, whereby agitation in at least up and down or side to side movement of separation bin 40 can be achieved by rapid reciprocation of piston 58.

In operation, apparatus 10 is connected to a vehicle 12 via mounting bracket 28. Vehicle 12 pulls apparatus 10 as motor 38 turns axle 34 causing paddles 32 to rotate. With the paddles rotating, deflector 64 loosens the soil, thereby allowing the paddles to transfer or sweep the soil and debris into separation bin 40, where sifting screen 42 allows the passage of soil but traps rock and other debris. Deflector 64, which extends from the chassis in proximity to the front of separation bin 40 not only loosens the soil but also keeps deflected soil and debris from traveling below the separation bin 40. Separation bin 40 reciprocates under the control of hydraulic assembly 50. Specifically, pistons 58 reciprocate in cylinders 56 to shake separation bin 40 and agitate the contents thereof to facilitate separation of soil from debris. As the separation bin 40 fills with rock and debris, separation becomes more difficult. When separation bin 40 is nearly full, hydraulic switching valve 116 is deactivated. To dump the rock and other debris, the hydraulic arms of vehicle 12 lift front portion 22 of chassis 20, and then tilts apparatus 10 rearwardly until rock and debris empty from separation bin 40 along slanted rear wall 48. To facilitate complete emptying of separation bin 40, hydraulic switching valve 116 may be activated to shake any remaining contents from separation bin 40. Once emptied, vehicle 12 returns ground-cleaning apparatus 10 to a location for continued ground cleaning.

While the invention has been described in its presently preferred embodiments, it will be understood that the invention is capable of certain modification and change without departing from the spirit of the invention as set forth in the appended claims.

What is claimed is:

1. A ground-cleaning apparatus for separating debris from soil collected from a ground surface, comprising:
    a chassis;
    a deflector extending from said chassis for loosening said soil;
    a rotatable paddle assembly including a plurality of elongated paddles for sweeping said soil and debris;
    a pivotable separation bin including a sifting screen for filtering debris swept by said paddles; and
    a hydraulic assembly including a selectively actuated piston and cylinder assembly for reciprocating said separation bin such that debris is separated from the soil.

2. The ground-cleaning apparatus according to claim 1, wherein said hydraulic assembly farther includes a rocker arm connected to a rotatably supported axle extending across said separation bin, said axle connected to said separation bin for imparting rotational motion of said axle into reciprocal motion of said separation bin.

3. The ground-cleaning apparatus according to claim 2, wherein said axle is journaled in a bearing at each end on opposite sides of said separation bin.

4. The ground-cleaning apparatus according to claim 2, wherein said rocker arm is movable in a first direction and a second direction, said rocker arm limited in one of said first direction and said second direction by a spring.

5. The ground-cleaning apparatus according to claim 4, wherein said rocker arm is limited in the other of said first direction and said second direction by a stop.

6. The ground-cleaning apparatus according to claim 1, wherein said hydraulic assembly includes a rotatable axle extending across said separation bin for imparting reciprocal motion to said separation bin, said axle connected to said separation bin through actuating members extending transversely from said axle.

7. The ground-cleaning apparatus according to claim 6, wherein said actuating members are connected to said separation bin through support arms.

8. The ground-cleaning apparatus according to claim 1, wherein said plurality of elongated paddles extend substantially across a width of said chassis.

9. The ground-cleaning apparatus according to claim 1, wherein a mounting roller is provided along said chassis.

10. A ground-cleaning apparatus for collecting soil and debris from a ground surface and separating said debris from said soil, said apparatus comprising:
    a paddle assembly including a plurality of paddles spaced apart from one another, said paddle agitating said ground surface and sweeping said soil and debris;
    a separation bin disposed substantially adjacent to said paddle assembly and including a sifting screen at least partially surrounded by sidewalls and a rear wall;
    a hydraulic assembly including a selectively actuated piston and cylinder assembly for reciprocating said separation bin; and
    a chassis having a front frame for rotatably supporting said paddle assembly and a second frame for supporting said separation bin from which said selectively activated piston and cylinder assembly extend, said chassis adapted to be connected to a vehicle.

11. The ground-cleaning apparatus according to claim 10, wherein said hydraulic assembly further includes a rocker arm connected to a rotatably supported axle extending across said separation bin, said axle connected to said separation bin for imparting rotational motion of said axle into reciprocal motion of said separation bin.

12. The ground-cleaning apparatus according to claim 11, wherein said axle is journaled in a bearing at each end on opposite sides of said separation bin.

13. The ground-cleaning apparatus according to claim 11, wherein said rocker arm is movable in a first direction and a second direction, said rocker arm limited in one of said first direction and said second direction by a spring.

14. The ground-cleaning apparatus according to claim 13, wherein said rocker arm is limited in the other of said first direction and said second direction by a stop.

15. The ground-cleaning apparatus according to claim 10, wherein said hydraulic assembly includes a rotatable axle extending across said separation bin for imparting reciprocal motion to said separation bin, said axle connected to said separation bin through actuating members extending transversely from said axle.

16. The ground-cleaning apparatus according to claim 15, wherein said actuating members are connected to said separation bin through support arms.

17. The ground-cleaning apparatus according to claim 10, wherein said plurality of elongated paddles extend substantially across a width of said chassis.

18. The ground-cleaning apparatus according to claim 10, wherein said front frame is pivotably connected to said rear frame, and further comprising a flexible portion extending between said front frame and said separation bin.

19. The ground-cleaning apparatus according to claim 10, wherein said hydraulic assembly further includes a hydraulic motor for rotating said paddle assembly.

20. The ground-cleaning apparatus according to claim 10, wherein a mounting roller is provided along said chassis.

21. The ground-cleaning apparatus according to claim 10, further comprising a deflector extending from said chassis which assists in loosening the soil for the separation of debris.

22. A ground-cleaning apparatus for collecting soil and debris from a ground surface and separating said debris from said soil, said apparatus comprising:

- a paddle assembly including a plurality of elongated paddles for transferring said soil and debris;
- a separation bin disposed adjacent to said paddle assembly including a sifting screen;
- a hydraulic assembly including a selectively actuated piston and cylinder assembly for reciprocating said separation bin and a hydraulic motor for rotating said paddle assembly;
- a chassis having a front frame and a rear frame, said front frame mounting said hydraulic motor and rotatably supporting said paddle assembly, said rear frame mounting said piston and cylinder assembly and pivotally supporting said separation bin, said chassis adapted to be connected to a towing vehicle at said front frame and mounting a roller on said rear frame; and
- a deflector extending from said chassis for loosening said soil and debris;
- whereby said elongated paddles of said paddle assembly transfers said soil and debris onto said separation bin, wherein said debris is trapped by said sifting screen and said soil passes through said sifting screen as said separation bin is reciprocated by said piston and cylinder assembly.

\* \* \* \* \*